United States Patent

[11] 3,620,926

| [72] | Inventors | Otto Wagner;<br>Klaus Bauer; Wilfried Kaufmann; Erich Rauenbusch; Alfred Arens; Eckart Irion, all of Wuppertal-Elberfeld, Germany |
|---|---|---|
| [21] | Appl. No. | 887,755 |
| [22] | Filed | Dec. 23, 1969 |
| [45] | Patented | Nov. 16, 1971 |
| [73] | Assignee | Farbenfabriken Bayer Aktiengesellschaft Leverkusen, Germany |
| [32] | Priority | Dec. 24, 1968 |
| [33] | | Germany |
| [31] | | P 18 16 900.1 |

[54] PROCESS FOR THE ENRICHMENT OF L-ASPARAGINASE
4 Claims, No Drawings

| [52] | U.S. Cl. | 195/66 A |
|---|---|---|
| [51] | Int. Cl. | C07g 7/02 |
| [50] | Field of Search | 195/66 A |

[56] References Cited
UNITED STATES PATENTS 3,511,754   5/1970   Berk et al. .................... 195/66 A

*Primary Examiner*—Lionel M. Shapiro
*Attorney*—McCarthy, Depaoli, O'Brien & Price ABSTRACT: L-asparaginase is obtained in concentrated purified form by fractional precipitation of an aqueous solution thereof with low molecular weight solvents, specifically diols of 4 to 8 carbon atoms, such as 2-methyl-pentane-diol-(2,4) and including such diols wherein one hydroxyl group is alkylated, for example 3-methoxybutanol.

PROCESS FOR THE ENRICHMENT OF L-ASPARAGINASE

BACKGROUND OF THE INVENTION

1. Field of the Invention

The present invention is, in general, directed to a process for the enrichment of L-asparaginase and more particularly to an economical method suitable for application on an industrial scale and leading to products of a degree of purity acceptable for clinical use.

2. Description of the Prior Art

L-asparaginase is a recognized enzyme and is known to occur in *E. coli* cells [Biochem. 6 (1967), pgs. 721–730]. It is also known that this enzyme is effective against malignant cells which require L-asparagine for growth [Proc. N.A.S. 56, 1516–1519 (1966)].

In an earlier application U.S. Pat. application Ser. No. 787,195, filed Dec. 26, 1968, there has been disclosed the extraction of L-asparaginase from *E. coli* cells and further enrichment and purification to crystallization in U.S. Pat. application Ser. No. 786,901 filed Dec. 26, 1968.

In general the fractionation of proteins by means of water-miscible solvents is well known. The enrichment of enzymes from the muscles of rabbits by fractional precipitation of aqueous extracts which are poor in ions, with the aid of acetone in the cold has been described in 1951 [Biochem. J. 48 (1951) p. 42]. In our earlier application (See Ser. No. 786,901, referred to above,) the fractionation of crude L-asparaginase with acetone as suitable for the first enrichment stage has been disclosed and the further precipitation of L-asparaginase from its aqueous solution has been proposed therein.

SUMMARY OF THE INVENTION

It has now been found that diols are especially suitable for the fractionation of L-asparaginase. The advance constituted by the process according to the invention can be seen from the fact that it is now possible to obtain L-asparaginase by reprecipitation with low-molecular solvents at room temperature and at very low technical expenditure in the high degree of purity which is required for clinical application. The peak fractions have a high specific activity; it is possible to cause them to crystallize by known methods of enzyme chemistry without further purification.

Suitable diols are water-soluble diols with 4–8 carbon atoms, including those in which one hydroxyl group is alkylated, for example, the isomeric butane-diols, pentane-diol-(1,5), hexane-diol-(2,5), 2-methylpentane-diol-(2,4), 3-methoxybutanol.

The fractionation can be carried out at the pH values at which the enzyme is stable in an aqueous solution, i.e. at pH 4–9. The fraction boundaries are particularly distinct in the vicinity of the isoelectric point, for example, at pH 5.0.

If crude L-asparaginase of 2–4 u./mg. is used as starting material for the fractionation, it may be expedient previously to admit the aqueous solutions with amides which release hydrogen bridge bonds, for example, urea, guanidine salts, acetamide, formamide etc.

The term "unit" as used herein comprises the amount of enzyme which liberates 1 mol ammonia from an asparagine solution at 37° C. within 1 minute.

At the time of writing, it is not yet established whether the L-asparaginases formed by various strains of *E. coli* are completely identical; where slight differences have been noticed, the nature of these differences is not yet clearly understood. The fractionating process is suitable for L-asparaginases from all strains of *E. coli*, for example *E. coli* ATCC 9637, 4157, 8677, 8739, 9723, 10536, 10586, 11105, 11126, 12142, 12408, 12911, 13676, 13706, 13762, 14948, 11303.

DESCRIPTION OF PREFERRED EMBODIMENTS

EXAMPLE I 5.0 g. of L-asparaginase with 67 u./mg. substance (obtained by twice fractionating crude L-asparaginase with acetone) were dissolved in bidistilled water, the pH value was adjusted with 1 N hydrochloric acid to pH 5.0, and the solution was made up to a volume of 100 ml. 20 ml. 2-methylpentane-diol-(2,4) were slowly added with stirring to the clarified solution, precipitation being thus achieved. The centrifuged and dried sediment was marked fraction A. The fraction B was obtained from the supernatant solution by the addition of a further 20 ml. 2-methylpentane-diol-(2,4), and the fractions C–G were obtained in an analogous manner by the addition of 10 ml. of solvent each time. The result of the fractionation can be seen from the following Table.

| Fraction: | Yield as mg. | U/mg. | U/precipitation | U as percent of starting material |
|---|---|---|---|---|
| A | 1,070 | 13.7 | 14,700 | 4.4 |
| B | 645 | 26.0 | 16,800 | 5.0 |
| C | 330 | 13.3 | 4,390 | 1.3 |
| D | 255 | 34.0 | 8,700 | 3.1 |
| E | 270 | 81.7 | 22,000 | 6.6 |
| F | 775 | 158.0 | 122,500 | 36.5 |
| G | 570 | 22.6 | 11,680 | 3.5 |

100 mg. of the fraction F were dissolved in 2.0 ml. of citrate buffer, pH 5.0, the solution was clarified by centrifuging and mixed with 1.0 ml. ethanol p.A. After 48 hours storage in a refrigerator, the sample had completely and uniformly crystallised.

EXAMPLE II 2.8 g. of L-asparaginase with 35 u./mg. substance were dissolved in 100 ml. of tris-buffer, pH 8.5. 48 ml. 2-methyl-pentane-diol-(2,4) were first added, the solution was separated from the precipitate and then mixed with a further 25 ml. 2-methylpentane-diol-(2,4). The second fraction consisted of 601 ml. of L-asparaginase with an activity of 92 u./mg. substrate. In the present example and in examples 3, 4, 6, 7, 8 and 9, the residual L-asparaginase was recovered almost quantitatively, although in a somewhat less pure form, by further precipitation.

EXAMPLE III 2.8 g. of L-asparaginase with 35 u./mg. substrate were dissolved in analogy with example II and fractionated first with 48 ml., then with 17 ml. 3-methoxybutanol-(2). The second fraction consisted of 425 mg. L-asparaginase with an activity of 87 u./mg. substance.

EXAMPLE IV 2.8 mg. of L-asparaginase with 35 u./mg. substrate were dissolved in analogy with example 2 and fractionated first with 61, then with 21 ml. 3-methylpentane-diol-(2,4). The second fraction consisted of 320 mg. L-asparaginase with an activity of 91 u./mg. substrate.

EXAMPLE V 1 g. of L-asparaginase which had been prefractionated with acetone and contained 110 u./mg. substrate was dissolved in 20 ml. of bidistilled water at pH 5.0 and fractionated with hexane-diol-(2,5) after clarification. The fraction A was obtained by the addition of 10 ml., fraction B and C by the addition of 2.0 ml. each time, and fraction D by the addition of 6.0 ml. The distribution of activity is shown in the following table.

|  | Yield as mg. | U/mg. | U/precipitation | U as percent of starting material |
|---|---|---|---|---|
| Fraction: | | | | |
| A | 175 | 26.4 | 4,620 | 4.2 |
| B | 125 | 104.0 | 13,000 | 11.8 |
| C | 140 | 178.0 | 24,800 | 22.6 |
| D | 90 | 77.3 | 6,930 | 6.3 |

The fraction C could be obtained in crystallized form from aqueous ethanol in analogy with example I.

EXAMPLE VI 50 g. of crude asparaginase from *E. coli* ATCC 9637 were dissolved in 1,000 ml. of redistilled water at pH 5.0. Fractionation was carried out first with 500 ml. 2-methylpen-tane-diol-(2,4) (fraction A), then with 100 ml. (fraction B) and then with portions of 200 ml. (fractions C to E). The fraction D contained 4.3 g. of L-asparaginase with 23 u./mg. substrate.

EXAMPLE VII

A 5 percent solution of 4.0 g. of L-asparaginase with 23 u./mg. substrate (obtained according to example VI) were subjected to another fractionation at pH 5.0 with 2-methyl-pentane-diol-(2,4). The peak fraction was precipitated when the amount of solvent added was increased from 64 ml. to 72 ml. It contained 285 mg. of L-asparaginase with 85 u./mg. substrate.

EXAMPLE VIII 50 g. of crude asparaginase from *E. coli* 11303 with 2.0 u./mg. substance were dissolved in 1,000 ml. of redistilled water at pH 5.2, and fractionated with 2-methylpentane-diol-(2,4) in analogy with example VI. The peak fraction contained 1.6 g. of L-asparaginase with an activity of 24 u./mg. substance.

EXAMPLE IX 5 g. of crude asparaginase from *E. coli* ATCC 9637 with 3.8 u./mg. substance were dissolved in 100 ml. of tris-buffer at pH 8.5, which contained 14.4 urea, and fractionated with 2-methylpentane-diol-(2,4). The peak fraction contained 300 mg. of L-asparaginase with 17.3 u./mg. of substance.

EXAMPLE X 1,000 g. of crude asparaginase with an activity of 3.6 u./mg. substance were dissolved in 20 liters of redistilled water and fractionated at pH 5.0 with 2-methylpentane-diol-(2,4) in analogy with example I. The peak fraction contained 20.3 u./mg. substance. By repeating the fractionation 5 times, there was obtained a preparation which could be crystallized from aqueous ethanol.

| Analyses: | protein | 228.00 u./mg. |
|---|---|---|
| | protein (biuret test) | 88.90% |
| | water | 10.90% |
| | residue | 0.08% |

What is claimed is:

1. The process for the enrichment of L-asparaginase which comprises fractionally precipitating the enzyme from an aqueous solution thereof by addition of a diol containing 4 to 8 carbon atoms.

2. The process as defined in claim 1 wherein the pH of the solution is maintained at from 4 to 9.

3. The process as defined in claim 1 wherein the pH of the solution is maintained at about 5.

4. The process as defined in claim 3 wherein the diol is 2-methyl-pentane-diol-(2,4).

* * * * *